United States Patent
Jun et al.

(10) Patent No.: US 7,027,509 B2
(45) Date of Patent: Apr. 11, 2006

(54) HIERARCHICAL HYBRID SHOT CHANGE DETECTION METHOD FOR MPEG-COMPRESSED VIDEO

(75) Inventors: Sung Bae Jun, Seoul (KR); Kyoung Ro Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 931 days.

(21) Appl. No.: 09/798,936

(22) Filed: Mar. 6, 2001

(65) Prior Publication Data
US 2001/0021268 A1 Sep. 13, 2001

(30) Foreign Application Priority Data
Mar. 7, 2000 (KR) ............................... 2000-11335

(51) Int. Cl.
*H04N 11/04* (2006.01)

(52) U.S. Cl. ..................... 375/240.16; 375/240.01; 375/240.26; 375/240.13; 375/240.15; 348/700

(58) Field of Classification Search ............... 348/700; 375/240.01, 240.26, 240.13, 240.15, 240.16

See application file for complete search history.

(56) References Cited

U.S. PATENT DOCUMENTS

| | | | |
|---|---|---|---|
| 5,774,593 A | 6/1998 | Zick et al. | 382/236 |
| 5,900,919 A | 5/1999 | Chen et al. | 348/700 |
| 5,911,008 A | 6/1999 | Niikura et al. | 382/236 |
| 6,549,643 B1* | 4/2003 | Toklu et al. | 382/107 |
| 6,735,253 B1* | 5/2004 | Chang et al. | 375/240.16 |

FOREIGN PATENT DOCUMENTS

| | | |
|---|---|---|
| EP | 0 780 776 A1 | 6/1997 |
| JP | 10-257436 | 9/1998 |
| WO | WO 98/21688 | 5/1998 |

OTHER PUBLICATIONS

Smoliar et. al., Summer 1994, IEEE Multimedia, pp. 62-72.*
Lupatini, G.; Saraceno, C.; Leonardi, R., Scene break detection: a comparison, Feb. 1998, Continuous-Media Databases and Applications. Proceedings. Eighth International Workshop, pp. 34-41□□.*

(Continued)

*Primary Examiner*—Mehrdad Dastouri
*Assistant Examiner*—Patrick Cathey, II
(74) *Attorney, Agent, or Firm*—Fleshner & Kim, LLP

(57) ABSTRACT

The present invention relates to a hierarchical hybrid shot change detection method in MPEG-compressed video circumstances, wherein the method according to the present invention comprises: detecting a shot change candidate region, by hierarchically applying a global color distribution difference among the frames by the color histogram; detecting an abridged shot change candidate region by using the difference of the global color histogram difference among adjacent I, P frames after additionally decoding P frames existed in the detected candidate region; decoding B frames within a abridged shot change detection candidate region at a macro block level in a sequence of the B frames sharing adjacent two anchor frames; determining a distribution characteristic of an intra coded block and a reference pattern type of each B frame in the region; and detecting a hard cut by using the distribution characteristic and reference type.

18 Claims, 5 Drawing Sheets

OTHER PUBLICATIONS

Koprinska, I.; Carrato, S., Video Segmentation of MPEG Compressed Data, Sep. 1998, IEEE Multimedia, pp. 243-246.*

Bertino et al., ACM Transactions on Information Systems, vol. 21, No. 2, Apr. 2003, pp. 155-191.*

European Search Report.

Kaneko, Toshimitsu and Osamu Hori, "High Speed Cut Detection from MPEG Encoded Movies using Motion Vectors," The Institute of Electronics, Information and Communication Engineers, Technical Report, Nov. 22, 1996, pp. 55-62.

* cited by examiner

HIERARCHICAL HYBRID SHOT CHANGE DETECTION METHOD FOR MPEG-COMPRESSED VIDEO

BACKGROUND OF THE INVENTION

1. Field of the Invention

The present invention relates to a video searching/browsing, in particular to a hierarchical hybrid shot change detection method for MPEG-compressed video.

2. Description of the Prior Art

Recently, with the development of a digital video processing technology and an image/video recognition technology, users can search and browse a desired part of a desired video (drama, movie, documentary etc.) at a desired time point.

A shot segmentation technology and a shot clustering technology are basic technologies for performing a non-linear video browsing and a searching Recent researches are concentrated on the shot segmentation technology, while researches about the shot clustering technology start now.

The shot segmentation technology is a technology for dividing video into each separated shot, and the shot clustering technology is a technology for extracting scene information on the basis of time/image/motion/audio/meaning similarity.

The shot means a sequence of video frames gotten from a camera without interruption and it is the most basic unit for analyzing or constructing video data. The video is constructed with lots of shots.

In general, in a video stream, shots are connected by using various editing effects, herein, an editing method used in a video editing is divided into an abrupt shot transition and a gradual shot transition.

The abrupt shot transition is a method for simply connecting the last frame of one shot to the first frame of the other shot without any additional editing effect. Herein, the abrupt shot transition is called as a hard cut.

The gradual shot transition is a method for gradually changing shots from one shot to the other shot by using the editing effect such as a fade, a dissolve, a wipe etc.

In the meantime, among methods for detecting a shot transition region in the video, a shot segmentation method using a global color distribution on the basis of a color histogram is largely used. The shot segmentation method can get color histogram information after decoding video frames up to a picture level prescribed by a MPEG, accordingly its processing speed is very slow.

In order to solve above-mentioned problem, there is a shot segmentation method using a characteristic of a MPEG stream in compressed domain and a characteristic of picture types of I, P, B. And also there is a shot change detection method using type information of a macro block corresponding to position of adjacent B pictures in a MPEG stream and a comparison table of themselves.

However, when a plurality of shot change candidates are detected in a GOP (group of Pictures), it is difficult to accurately detect an actual shot change point with the shot segmentation method, and its performance is low.

In the meantime, in the shot change detection algorithm method, because shot change detection is performed in the compressed domain, its processing speed is very fast. However, if a shot change candidate region is big, the shot change detection can be easily affected by the performance of an encoder because all processing are performed in the compressed domain. And its actual processing speed or detection performance are low because miss ratio and false alarm ratio are high. Accordingly it is not suitable for an actual application.

SUMMARY OF THE INVENTION

The object of the present invention is to provide a hierarchical hybrid shot change detection method for MPEG-compressed video which is capable of rapidly detecting shot change by adapting MPEG data hierarchically.

The other object of the present invention is to provide a hierarchical hybrid shot change detection method for MPEG-compressed video, which is capable of detecting a shot change region of a video stream for performing a non-linear browsing and searching rapidly and accurately, by hierarchically applying the difference of color histograms and a distribution characteristic of macro block types.

In order to achieve the objects of the present invention, the hierarchical hybrid shot change detection method for MPEG-compressed video in accordance with the present invention hierarchically applying a global color histogram based method and a macro block type distribution based method comprising detecting a shot change candidate region by using the global color distribution difference among the frames by the color histogram, detecting an abridged shot change candidate region by using the difference of the global color histogram among adjacent I/P, P/P, P/I frames after additionally decoding the P frames existed in the detected candidate region, finding a distribution characteristic of an intra coded block and a reference type and a reference pattern of the each B frame by decoding the B frames in the detected abridged shot change candidate region at the macro block level, and detecting a hard cut occurrence by using the distribution characteristic of the intra coded block and reference type and reference pattern.

A shot change detection method using a macro block distribution characteristic in accordance with the present invention comprises decoding B frames in a shot change candidate region at a macro block level for a sequence of the B frames sharing adjacent two anchor frames determining a distribution characteristic of an intra coded block and a reference pattern type of the each B frame in the candidate region, and detecting a hard cut by using the distribution characteristic of the intra coded macro block and reference type of macro blocks

DETAILED DESCRIPTION OF THE PREFERRED EMBODIMENT

The present invention relates to a hierarchical hybrid shot change detection method hierarchically applying a method based on a global color histogram and a method based on type distribution characteristic of a macro block. A method for detecting a shot change by hierarchically applying the algorithms will now be described as below.

First, a shot candidate region is detected by using the difference of global color distribution among I frames found by the shot detection algorithm based on the color histogram, P frames in the detected candidate region are decoded additionally, and an abridged shot change suspicious region is detected by using the difference of the global color histograms among adjacent I/P or P/P or P/I frames. In the shot change suspicious region, a distribution characteristic of an intra coded block, and a reference type and a reference pattern of each B frame are found by decoding the B frames in the suspicious region at a macro block level, and a hard cut position is detected by using them.

The above-mentioned hierarchical hybrid shot change detection method for MPEG-compressed video will now be described in detail with reference to accompanying drawings.

Figure 1:
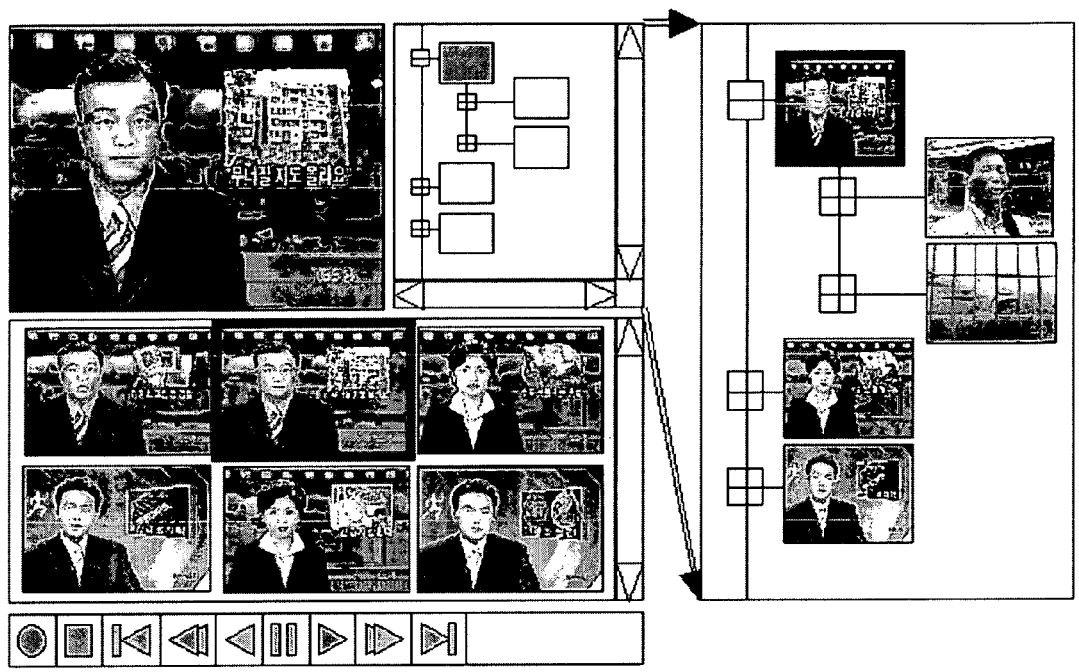
FIG. 1 is a construction profile illustrating an embodiment of a user interface for a non-linear video browsing in accordance with the present invention.

FIG. 1 is a construction profile illustrating an embodiment of a user interface for non-linear video browsing in accordance with the present invention. When only reference shot is displayed on a screen by dividing video into audio/image/motion/meaning by using an interface, a user can watch easily a user request part without watching the whole video.

There is a shot segmentation method and a shot clustering method as a basic method for performing the above-mentioned video browsing, and it will now be described with reference to accompanying FIG. 2.

Figure 2:
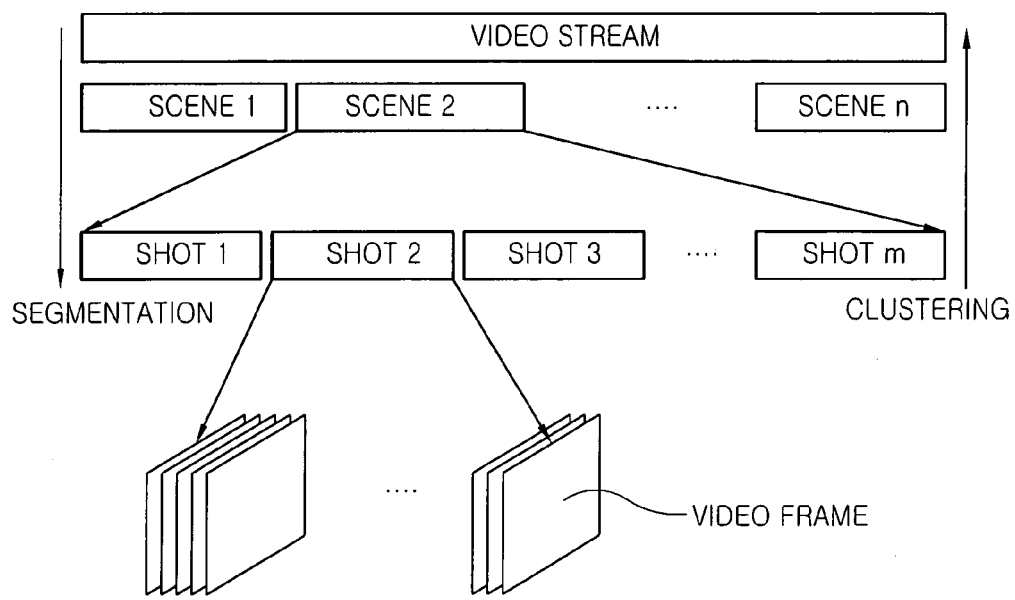
FIG. 2 is a construction profile illustrating a relation between a shot segmentation and a shot clustering in accordance with the present invention.

FIG. 2 is a construction profile illustrating a relation between a shot segmentation and a shot clustering in accordance with the present invention. The shot segmentation method divides a video stream into similar scenes by time/image/motion/audio, the scene is divided into separated shots, accordingly the user can easily watch the user request part without watching the whole video.

On the contrary, the shot clustering method is a method for constructing a video structure with a logical scene unit by binding the separated shots by similar shots on the basis of the time/image/motion/audio/meaning similarity.

Figure 3:
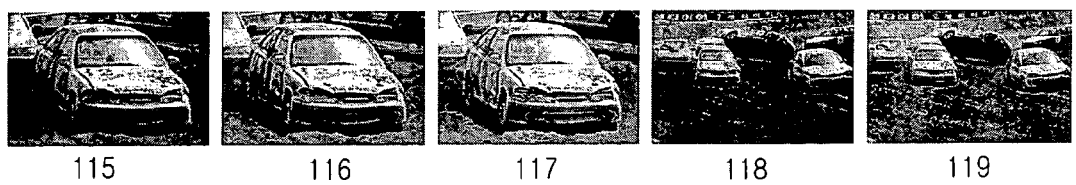
FIG. 3 illustrates an embodiment of a shot change by a hard cut in accordance with the present invention.

FIG. 3 illustrates an embodiment of a shot change by a hard cut in accordance with the present invention. Two shots can be connected by using the hard cut at a point changed from a frame of the first shot 117 to a frame of the second shot 118. Herein, the hard cut occurrence position is the start frame of the second shot 118 as the start of a new shot.

In the hard cut occurrence region, the color distribution difference among frames are very big, the hierarchical hybrid shot change detection method for the MPEG-compressed video in accordance with the present invention detects the hard cut by using the feature.

The shot segmentation method using the global color distribution based on the color histogram using the color distribution among the frames is the most accurate method for detecting the hard cut, however the processing speed of the shot segmentation method using the global color distribution based on the color histogram is slow as depicted in the prior art.

In the present invention, a DC image decoding method is used in order to improve the processing speed in the shot change point detection by the color histogram.

Herein, the DC image is an 1/64 times abridged image about the original image it has the image feature of the original image as it is by restoring each block as one pixel by using a DC value existed in an image of MPEG video as a block unit without performing an IDCT (Inverse Discrete Cosine Transform) operation.

The relation between the DC image and original image will now be described with reference to accompanying FIG. 4.

Figure 4:
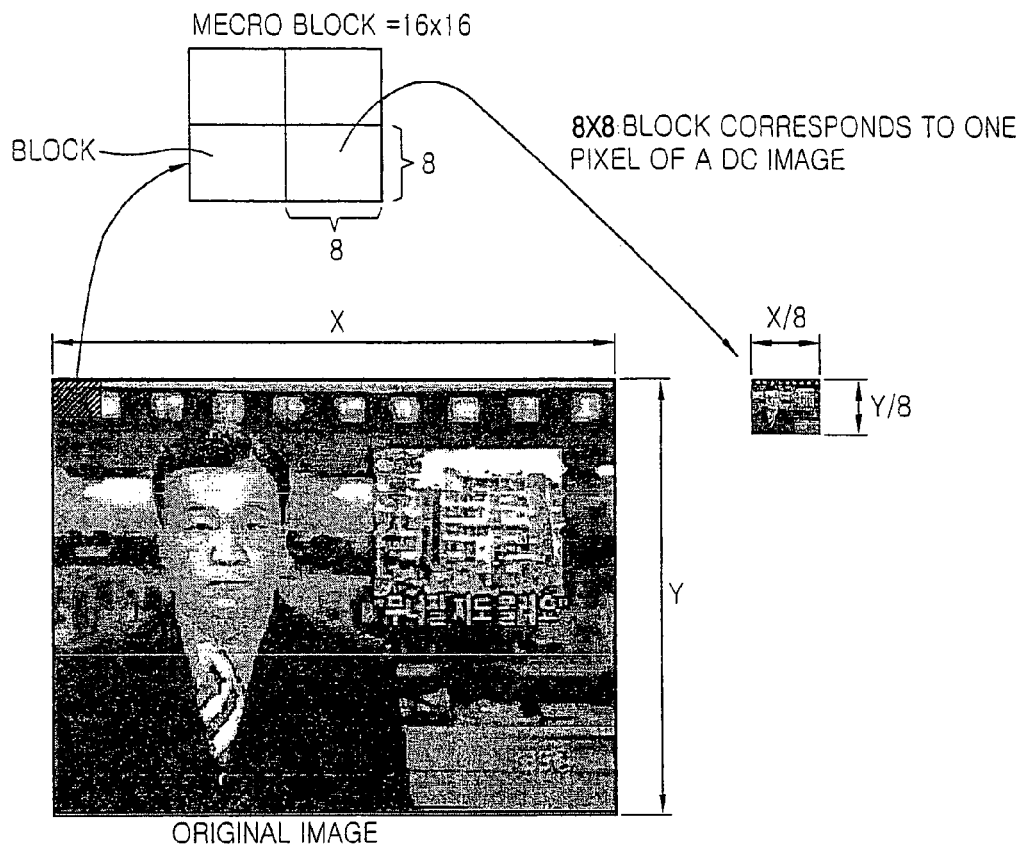
FIG. 4 is a construction profile illustrating a relation between the original image and a DC image in accordance with the present invention.

FIG. 4 is a construction profile illustrating a relation between the original image and DC image in accordance with the present invention. A DC image restoration method constructs a thumbnail image about the original image. One pixel of the thumbnail image corresponds to 1/8×1/8 of the original image.

In order to get a color histogram in an ordinary image, a method not examining the color value of all pixels but examining only sampling pixel is used, in the MPEG, the DC image restoration method using the MPEG video compression characteristic is mainly used for rapid thumbnail image restoration.

An algorithm for restoring the DC image shows good performance about I or P type frames, however there is many difference between the DC image and original image due to error accumulation in the DC image about the B frame.

In the present invention, in order to decode the B frames accurately the macro block type distribution characteristic is used.

By the above-mentioned characteristics, the hierarchical hybrid shot change detection algorithm for MPEG compressed video in accordance with the present invention is a hybrid algorithm arranging the shot detection algorithm based on the color histogram using a divide-and-conquer with a macro block information basis shot detection algorithm, and it is the hierarchical algorithm adapting the different algorithm to each process.

In the shot change detection process, a shot change candidate region in video is detected by using the shot detection algorithm based on the color histogram, the detected shot change candidate region is abridged by using the hybrid algorithm arranged with the shot detection algorithm on the basis of the information of the macro block, and the shot change point in the abridged shot change region is detected by using the shot detection algorithm based on the type distribution information of the macro block.

In order to detect the shot change candidate region of the video by using the shot detection algorithm based on the color histogram, the shot change candidate region is detected by comparing the color histograms of I frames of the video stream.

The detected candidate region is constructed with the two I frames and a sequence of the B, P frames existed between the two I frames, its volume is bigger than the volume of a GOP (Group of Picture) as big as 1 (+1).

The color histogram comparison among the frames can be performed in the original image, a sub-sampling image can be used in order to perform the processing more rapidly. In the simple embodiment using the sub-sampling image, the processing speed can be improved by restoring only the DC image.

The algorithm for the above-described shot change candidate region detection process can be described as below.

[Step 1]

$f_i \leftarrow$ First I frame, $f_j \leftarrow$ second I frame, HC={$f_i$}

[Step 2]

If (HistDiff($f_i$, $f_j$))>$\tau_{c1}$ then send [$f_i$, $f_j$] to [Step 3]
else, $f_i \leftarrow f_j \leftarrow$ Next I frame and
GoTo [Step 2](skip this GOP)

The $f_I$ and $f_j$ describes the sub-sampling image of the adjacent I frame or pertinent frame, the HistDiff ($f_i$, $f_j$) describes the global color histogram difference of the two images, the $\tau_{c1}$ describes a threshold for detecting the shot change candidate region based on the global color histogram difference.

The algorithm will now be described in detail with reference to accompanying FIG. 5.

Figure 5:
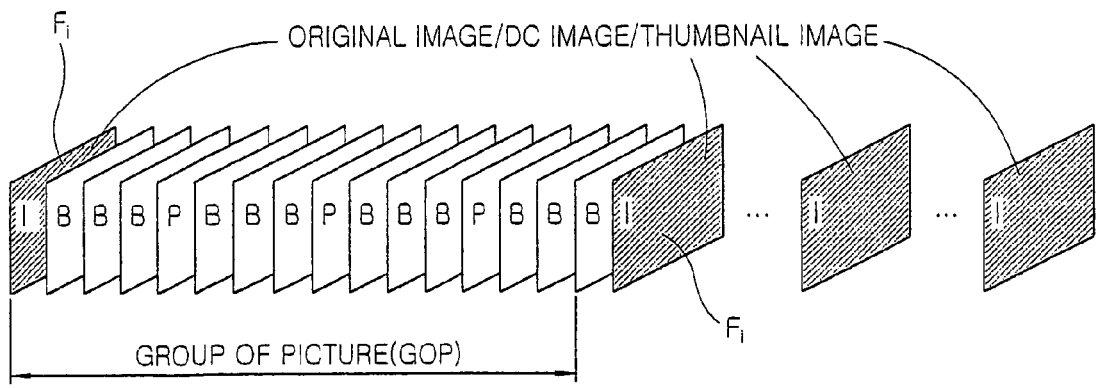
FIG. 5 is a construction profile of a video stream illustrating a shot change candidate detection in accordance with the present invention.

FIG. 5 is a construction profile of a video stream illustrating the shot change candidate detection in accordance with the present invention, the colored I frame is a frame to be decoded in the step 1, it corresponds to the $f_i$ and $f_j$.

The shot change candidate region based on the global color histogram is detected by scanning the video stream, the detected candidate region is outputted as a [$f_i$, $f_j$] format and is transmitted as an input of the next step. When, the detected candidate region is not the shot change candidate region, the pertinent GOP is skipped.

The detected shot change candidate region is abridged by using the hybrid algorithm arranging the shot detection algorithm based on the information of the macro block.

The shot change candidate region is abridged by detecting the shot change occurrence at a certain region within the [$f_i$, $f_j$] by restoring the original frame or sub-sampling image (DC image) about the P frames existed in the shot change candidate region [$f_i$, $f_j$] constructed with the start and end of the adjacent I frames.

The DC image restoring about the P frame is performed by using the type information of the macro block, motion vector, rest error value etc.

The abridged shot change region detecting process is the process for judging whether the shot change candidate region exist actually in the inputted shot change candidate region [$f_i$, $f_j$], when the shot change candidate region exists the abridged shot change candidate region [$f_i$, $f_j$] is transmitted to the next step.

When the shot change candidate region does not exist, it is informed to the pertinent GOP as there is not the actual shot change candidate region, it detects the next shot change candidate region by the detecting process for detecting the shot change candidate region based on the color histogram.

The algorithm in accordance with the shot change candidate region abridging process can be described as below.

[Step 3]

Decoding I, P frames [$f_1$, $f_2$, $f_k$] at [$f_i$, $f_j$]

[Step 4]

Select I, m (a=1, 2, 3, . . . , k−1) in order to make HistDiff($f_i$, $f_m$) have a maximum value about ($f_a$, $f_{a+1}$) at [$f_1$, $f_2$, $f_k$]

[Step 5]

if (HistDiff($f_i$, $f_m$)>$\tau_{c2}$) then send [$f_i$, $f_m$] to [Step 6]
else, $f_i \leftarrow f_j$ and $f_j \leftarrow$ Next I frame and
Go To [Step 2](skip this GOP)

The [$f_i$, $f_j$] is the shot change candidate region outputted from the first step.

The [$f_i$, $f_j$] describes the shot change candidate region abridged in the second step as a sub region of the [$f_i$, $f_j$].

The $f_i$, and $f_m$ are DC images about the I or P frames existed in the [$f_j$, $f_j$] region.

The $\tau_{c2}$ is the threshold for abridging the shot change candidate region on the basis of the difference of the global color histograms.

In the Step 3, not decoding all frames existed in the shot change candidate region [$f_i$, $f_j$], but the I frames and P frames in the candidate region are decoded.

In the process, the image to be decoded can be the original image, a thumbnail image of the original image can be restored without restoring the whole image in order to perform the algorithm more rapidly. In addition, the color histogram can be found by using the DC image restoration algorithm using the MPEG video compression characteristic.

In the Step 4, the difference of the maximum color histogram is selected by the comparison of the global color histograms among the adjacent frames in [I, P, P, P, . . . , P, I] sequence within the input region.

When the difference among the selected maximum color histograms is bigger than a certain threshold $\tau_{c2}$, the abridged shot change candidate region [$f_i$, $f_m$] is outputted to the next step, when the difference among the selected maximum color histograms is not bigger than a certain threshold $\tau_{c2}$ it is judged there is no hard cut in the [$f_i$, $f_j$] region, and it is returned to the shot change candidate detection step (Step 2) based on the color histogram.

The difference between the selected maximum color histograms is not bigger than the certain threshold $\tau_{c2}$ mostly in a camera motion existing region or a region having big motion of an object or a region used an editing effect such as a dissolve, fade and wipe etc.

The process for abridging the shot change candidate region will now be described with reference to accompanying FIG. 6.

Figure 6:
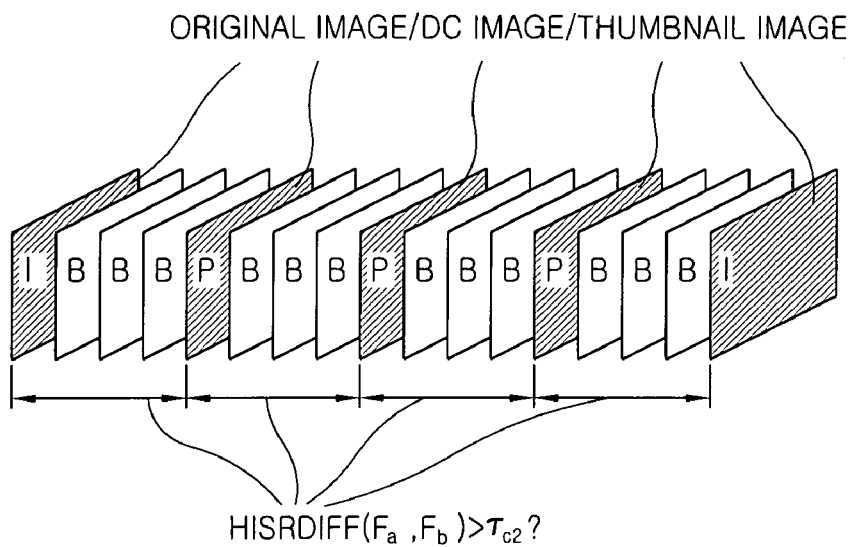
FIG. 6 is a construction profile of a video stream illustrating a shot change candidate abridgment in accordance with the present invention.

FIG. 6 is a construction profile of a video stream illustrating the shot change candidate abridgement in accordance with the present invention, it describes frames to be decoded in the process for abridging the shot change candidate region.

The threshold $\tau_{c2}$ used in the process may be the same value with the certain threshold $\tau_{c1}$ used in order to detect the shot change candidate region on the basis of the global color histogram difference.

In the above-mentioned embodiment, the method using the threshold is represented, it is also possible to use a peak detection algorithm in the Step 5 in order to improve the actual performance.

The peak detection algorithm will now be described with reference to accompanying FIG. 7.

Figure 7:
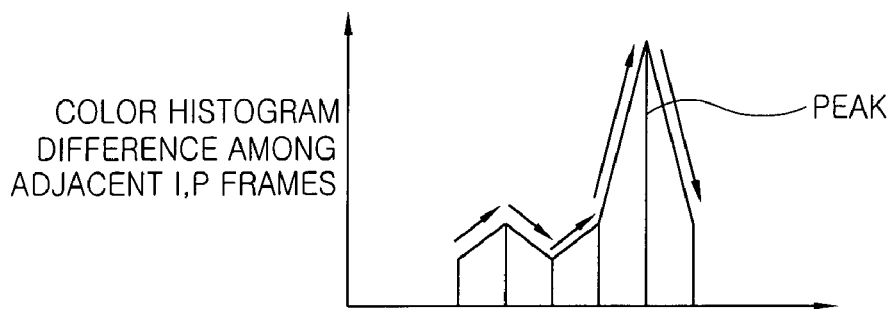
FIG. 7 illustrates a peak detection method using gradient variance about the difference of color histograms in accordance with the present invention.

FIG. 7 illustrates a peak detection method using gradient variance about the difference of the color histograms in accordance with the present invention. There is a method finding the difference of the color histograms among the I, P frames adjacent to the candidate region [$f_i$, $f_j$] and using the gradient of the found value, and a method using the peak ratio about an average etc. in the peak detection methods.

By the above-mentioned methods, the shot change region among the frames can be detected accurately.

In the MPEG as the compression standard of audio/video data using compression among frames, a motion prediction and a motion compensation are performed for compression among frames. A frame which is a standard among the frames in the motion compensation/prediction is generally called as an anchor frame.

The anchor frame is the standard of the motion prediction/compensation among the frames, the anchor frame about the B frame among the video frames is the adjacent back and forth I or P frames, there is always two anchor frames.

Among the video frames, because the I frame is constructed with only the intra coded blocks, the anchor frame about the I frame does not exist, and the anchor frame about the P frame is the previous I frame or P frame.

Accordingly, four types of macro blocks such as an intra coded, forward prediction, backward prediction, two way prediction exist in the B frame, and two types of macro blocks such as the intra coded, motion prediction exist in the P frame.

At the last, the shot change point is detected by using the shot detection algorithm by the type distribution information of the macro blocks in the abridged shot change region of the detected video frame.

The abridged shot change candidate region $[f_I, f_m]$ has the two anchor frames as the start and end of the region, when the B frames exist at the middle of the sequence, the all B frames at the middle portion own $f_1$ and $f_j$ jointly as the anchor frames.

Accordingly, when the sequence of the shot change candidate region is described as $[A_1, B_1, B_2, \ldots, B_K, A_2]$, the B in the sequence describes a B type frame, and A describes I or P frame as the anchor frame.

The above-described method for detecting the shot change point can be described as a below algorithm.

[Step 6]
Calculate $M_{intra}(B_i)$ about $B_1, B_2, \ldots, B_k$ in the inputted $[A_1, B_1, B_2, \ldots, B_K, A_2](i=1, 2, \ldots, k)$
Perform the peak detection algorithm about $M_{intra}(B_i)$
Frame detected as $B_h \leftarrow$ peak
[Step 6]
if one $B_h$ exists
then Add as $B_h$ to HC and
$f_i \leftarrow f_j$ and $f_j \leftarrow$ Next I frame and Go To [Step 2]
else Go to [Step 7]
[Step 7]
Examine pattern about $B_1, B_2, \ldots, B_k$ at the inputted $[A_1, B_2, \ldots, B_k, A_2]$(Fwd, Bwd, None)
[Step 7-1]
If the pattern is Bwd, Bwd, ..., Bwd
(All Bwd pattern of $B_1, B_2, \ldots, B_k$) then
Add $B_1$ to HC and $f_i \leftarrow f_j$ and $f_j \leftarrow$ Next I frame and Go To [Step 2]
[Step 7-2]
else if the pattern is Fwd, ..., Fwd, Bwd, Bwd
(There are two runs, the first part is all Fwd pattern and the second part is all Bwd pattern) then
Add $B_h$ to HC and $f_i \leftarrow f_j$ and $f_j \leftarrow$ Next I frame and Go To [Step 2]
where $B_h$ is the first frame of the Bwd run.
[Step 7-3]
else if the pattern is Fwd, Fwd, ..., Fwd, Fwd
(All Fwd pattern for $B_1, B_2, \ldots, B_k$) then
Add $A_2$ to HC and $f_i \leftarrow f_j$ and $f_j \leftarrow$ Next I frame and Go To [Step 2]
[Step 7-4]
else $f_i \leftarrow f_j$ and $f_j \leftarrow$ Next I frame and Go To [Step 2](skip this GOP)

The $[A_1, B_2, \ldots, B_k, A_2]$ is the abridged shot change candidate region outputted from the step for abridging the shot change candidate region, and the $M_{intra}(f)$ describes the ratio of the intra coded macro block at the frame F.

The Fwd describes the forward pattern, and the Bwd describes the backward pattern.

When forward prediction is mainly used in the pertinent B frame as the pattern about the $B_1, B_2, \ldots, B_k$, it is described as the Fwd, when the backward prediction is mainly used in the pertinent B frame as the pattern about the $B_1, B_2, \ldots, B_k$, it is described as the Bwd, when the both are used as same ratio, it is described as a None.

The type of the B frame can be found by adapting the forward reference ratio and threshold about it. The forward reference ratio can be found by dividing the number of forward prediction macro blocks by the sum of the number of the forward prediction macro blocks and number of backward prediction macro blocks.

The above explanation can be described as a below equation.

$$\text{Forward prediction ratio} = M_{fwd}/(M_{fwd}+M_{bwd}) \qquad \text{Equation 1}$$

Herein, $M_{fwd}$ is the number of the forward macro blocks, and $M_{bwd}$ is the number of the forward macro blocks.

The Step 6 describes a method for detecting a hard cut by using the ratio of the intra coded blocks in the B frames, the hard cut occurrence point is detected by performing the peak detection algorithm about the ratio of the intra coded blocks of the B frames in the detected region.

However, a threshold application method can be used in case of needs on the behalf of the peak detection algorithm.

The ratio relation of the intra coded blocks of the B frame will now be described in detail with reference to accompanying FIG. 8.

Figure 8:
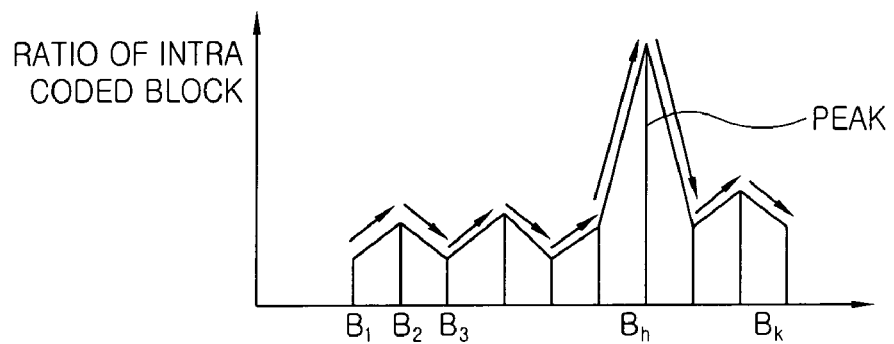
FIG. 8 illustrates a peak detection method using gradient variance about an intra coded block of a B frame in accordance with the present invention.

FIG. 8 illustrates a peak detection method using the gradient variance about an intra coded block of a B frame in accordance with the present invention. The peak is the maximum ratio point of the intra coded blocks about the B frames, and the peak detection point is judged as the hard cut occurrence point.

The step 7 describes the relation between the reference pattern of the macro blocks and frames to be selected as the actual hard cut point in the B frames, it will now be described with reference to accompanying FIG. 9.

Figure 9:
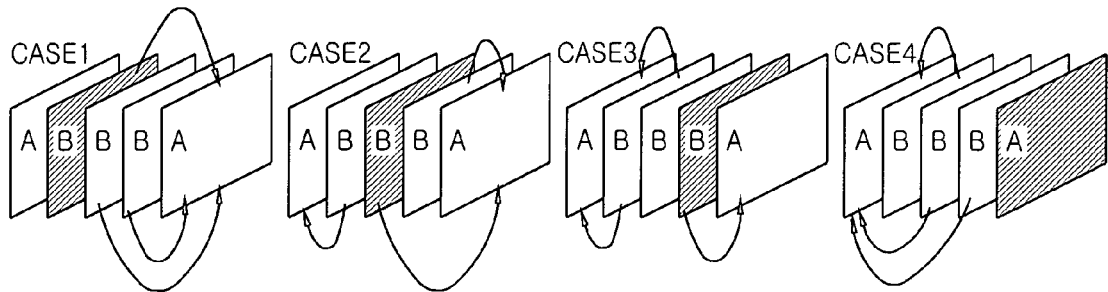
FIG. 9 illustrates an algorithm for detecting a shot change point using a motion vector reference pattern of a B frame in accordance with the present invention.

FIG. 9 illustrates an algorithm for detecting a shot change point using a motion vector reference pattern of a B frame in accordance with the present invention. In FIG. 9, case 1 corresponds to step 7-1, case 2 and 3 correspond to step 7-2, and case 4 correspond to step 7-3.

The colored frames describe the frame selected as the hard cut point in accordance with each pattern, an arrow describes the reference pattern of the pertinent B frame.

When the arrow indicates the previous anchor frame in temporal order, it describes the Fwd pattern, when it indicates the next anchor frame, it describes the Bwd pattern.

In the step 7, the B frames are divided into three types such as the Fwd, Bwd, None by reference patterns. The reference pattern about the frame is determined by using the forward reference ratio and two thresholds $\tau_u$, $\tau_d$. When the forward reference ratio is bigger than the threshold $\tau_u$, the reference pattern of the pertinent frame is determined as the Fwd, when the forward reference ratio is smaller than the threshold $\tau_u$, the reference pattern of the pertinent frame is determined as the Bwd, when it does not correspond to any of them, the reference pattern of the pertinent frame is determined as the None.

Generally, the threshold $\tau_u$ is bigger than 0.5, and the threshold $\tau_d$ is smaller than 0.5.

The relation between the forward reference ratio and threshold will now be described in detail with reference to accompanying FIG. 10.

Figure 10:
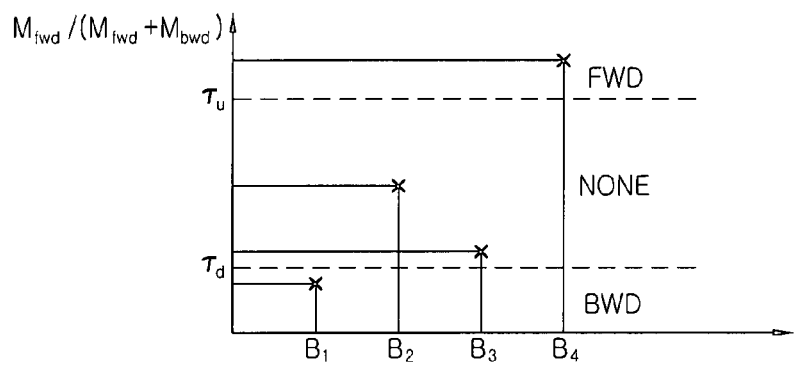
FIG. 10 illustrates a reference pattern determine method of a B frame using a threshold value about the forward reference ratio in accordance with the present invention.

FIG. 10 illustrates a reference pattern determine method of a B frame using threshold value about the forward reference ratio in accordance with the present invention.

The reference pattern is determined by adapting two threshold $\tau_u, \tau_d$ to the forward reference ratio $M_{fwd}/(M_{fwd} + M_{bwd})$ of the B frames of the pertinent region.

The reference pattern of $B_1$, of the B frames is the Bwd, the reference patterns of $B_2$ and $B_3$ are None, and the reference pattern of $B_4$ is the Fwd.

As described above, the method for detecting the shot change point in the MPEG compressed video circumstances by using the hierarchical hybrid shot change detection algorithm will now be described in detail with reference to accompanying FIG. 11.

Figure 11:
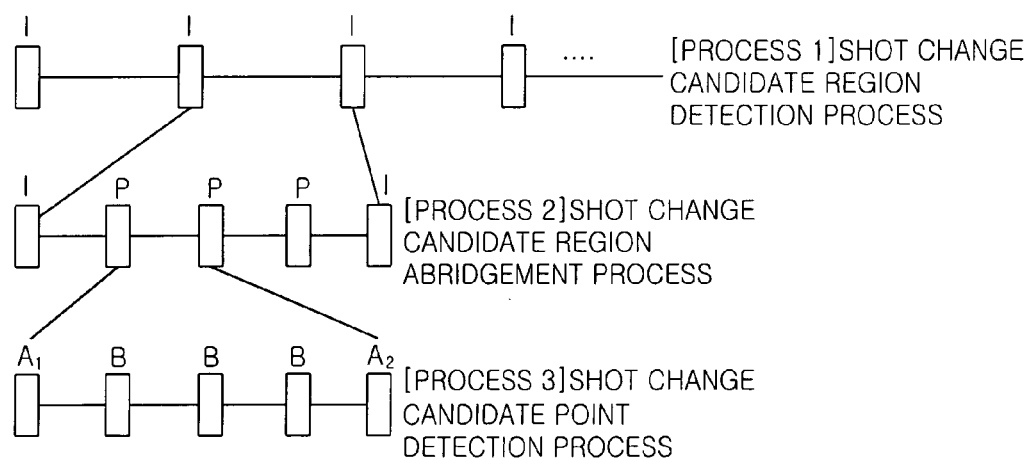
FIG. 11 is a construction profile illustrating overall order of a hierarchical hybrid shot change detection method for MPEG-compressed video in accordance with the present invention.

FIG. 11 is a construction profile illustrating overall order of a hierarchical hybrid shot change detection method for the MPEG-compressed video in accordance with the present invention.

In FIG. 11, a shot change candidate region is detected by using the difference of the color histograms of I frames in Step 1, P frames in the inputted region of step 1 are restored and the shot change candidate region is abridged on the basis of the color histograms among the adjacent I/P, P/P or P/I frames in the region in Step 2.

In Step 3, the accurate shot change point of the macro block level can be detected by using the ratio of the intra coded blocks and the variation of the Fwd/Bwd reference patterns in the B frames of the abridged region of the Step 2.

In the Step 1 and 2, the method for finding the color histogram can be divided into a method finding from the original frame, a method finding from a thumbnail image, and a method finding from a DC image.

As described above, the hierarchical hybrid shot change detection method for MPEG-compressed video in accordance with the present invention detects the shot change candidate region, embodies the hybrid algorithm arranging the shot detection algorithm by the color histogram on the basis of the divide-and-conquer with the shot detection algorithm by the macro block information in order to abridge the detected candidate region, and detects the shot change point by the hierarchical algorithm adapting different algorithm in accordance with each step, accordingly the present invention has higher accuracy and processing speed than the conventional shot change method using the hard cut algorithm.

In addition, the hybrid algorithm in accordance with the present invention can be used as the basis element in the shot segmentation system or shot clustering system, accordingly the present invention can be used practically for an apparatus using the conventional algorithm.

What is claimed is:

1. A hierarchical hybrid shot change detection method for MPEG-compressed video for detecting a shot change, by hierarchically applying a global color histogram based method and a macro block type distribution based method, comprising:

detecting a shot change candidate region by using the global color distribution difference among the frames by the color histogram;

detecting an abridged shot change candidate region by using the difference of the global color histogram among adjacent I/P, P/P, P/I frames after additionally decoding the P frames existed in the detected candidate region;

finding a distribution characteristic of an intra coded block and a reference type and a reference pattern of the each B frame by decoding the B frames in the detected abridged shot change candidate region at the macro block level; and detecting a hard cut occurrence by using the distribution characteristic of the intra coded block and reference type and reference pattern.

2. The hierarchical hybrid shot change detection method for MPEG-compressed video according to claim 1, wherein the color histogram can be extracted by restoring a pixel value of the whole image or by restoring a DC image or by restoring a thumbnail image as a sub-sampling image.

3. The hierarchical hybrid shot change detection method for MPEG-compressed video according to claim 1, wherein the process for detecting the shot change candidate region is proceeded only when the difference of the global color distribution among the frames is bigger than a first threshold $\tau_{c1}$, and the process performs detection of the shot change candidate region for the next GOP (Group of Picture) region when the difference of the global color distribution among the frames is not bigger than the first threshold $\tau_{c1}$.

4. The hierarchical hybrid shot change detection method for MPEG-compressed video according to claim 1, wherein the process for detecting the shot change candidate region selects adjacent I frames as the two frames for calculating the difference of the color histograms.

5. The hierarchical hybrid shot change detection method for MPEG-compressed video according to claim 1, wherein the process for detecting the abridged shot change candidate region comprises the steps of:

finding the difference of the global color histograms among the adjacent I/P, P/P, P/I frames by decoding the I, P frames in the detected shot change candidate region;

selecting a candidate region where the difference of the global color histograms is the maximum; and selecting the pertinent region as the abridged shot change candidate region when the difference of the color histograms in the selected candidate region is bigger than a second threshold $\tau_{c2}$ or performing the shot change candidate detection for the next GOP region when the difference of the color histograms in the selected candidate region is not bigger than the second threshold $\tau_{c2}$.

6. The hierarchical hybrid shot change detection method for MPEG-compressed video according to claim 5, wherein the second threshold $\tau_{c2}$ can be a value same with the first threshold $\tau_{c1}$ for detecting the shot change candidate region on the basis of the difference of the global color histograms.

7. The hierarchical hybrid shot change detection method for MPEG-compressed video according to claim 1, wherein the process for detecting the abridged shot change candidate region comprises the steps of:

calculating the difference of the global color histograms among the adjacent I/P, P/P, P/I frames by additionally decoding the P frames in the detected shot change candidate region;

detecting a peak by using a peak detection algorithm for the color histogram difference values; and selecting the pertinent region as the abridged shot change candidate region when the gradient about the detected peak is bigger than a certain threshold or performing the shot change candidate detection about the next GOP region when the gradient about the detected peak is not bigger than the certain threshold.

8. The hierarchical hybrid shot change detection method for MPEG-compressed video according to claim 7, wherein the peak detection algorithm uses the gradient about the difference of the color histograms among the frames or calculates the peak ratio about an average of the difference of the color histograms among the frames.

9. A shot change detection method using a macro block type distribution characteristic in MPEG-compressed video environment, comprising:

decoding B frames in a shot change candidate region at a macro block level for a sequence of the B frames sharing adjacent two anchor frames;

determining a distribution characteristic of an intra coded block and a reference pattern type of the each B frame in the candidate region; and detecting a hard cut by using the distribution characteristic of the intra coded macro blocks and reference type of macro blocks, wherein determining the reference pattern type of the B frame determines the reference type of the pertinent B frame as a forward reference pattern when a forward prediction ratio using two thresholds $(\tau_u, \tau_d)$ is bigger than a fourth threshold $(\tau_u)$, determines it as a none reference pattern when the forward prediction ratio is between the two thresholds $(\tau_u, \tau_d)$ and determines it as a backward reference pattern when the forward prediction ratio using the two thresholds $(\tau_u, \tau_d)$ is smaller than a fifth threshold $(\tau_d)$.

10. The shot change detection method using the macro block type distribution characteristic in MPEG-compressed video environment according to claim 9, wherein the process for decoding the B frames at the macro block level selects the B frame having the maximum ratio after calculating the ratio of the intra coded block at the each B frame, judges there is a hard cut when the ratio of the selected frame is bigger than a third threshold, and judges there is no hard cut when the ratio of the selected frame is not bigger than the third threshold.

11. The shot change detection method using the macro block type distribution characteristic in MPEG-compressed video environment according to claim 9, wherein the process for decoding the B frames at the macro block level adapts a peak detection algorithm about the calculated ratio after calculating the ratio of the intra coded block at the each B frame, judges there is a hard cut when there is one peak in the suspicious region, and judges there is no hard cut when at least two peaks exist in the suspicious region.

12. The shot change detection method using the macro block type distribution characteristic in MPEG-compressed video environment according to claim 9, wherein the process for determining the reference pattern type of the B frames determines the first B frame in the candidate region as a hard cut point when the all reference pattern types are backward reference patterns, determines the first frame of the latter half as the hard cut point when the first half of the reference patterns of the B frames are the forward reference patterns and the latter half of the reference patterns of the B frames are the backward reference patterns, determines the last frame of the abridged candidate region as the hard cut point when the all reference pattern types are forward reference patterns, and determines there is no hard cut when the all above-described conditions are not satisfied.

13. A shot change detection method for MPEG-compressed video comprising:

determining a shot change candidate region based on a global color distribution;

detecting an abridged shot change candidate region based on the global color distribution;

decoding a plurality of frames in the shot change candidate region;

determining a distribution characteristic of an intra coded block and a reference pattern type of frames in the candidate region; and detecting a cut based on the distribution characteristic of the intra coded block and the reference pattern type, wherein determining the shot change candidate region is proceeded only when a difference of the global color distribution among the frames is larger than a first threshold, and the process performs detection of the shot change candidate region for a next Group of Picture (GOP) region when the difference of the global color distribution among the frames is not larger than the first threshold.

14. A shot change detection method for MPEG-compressed video comprising:

determining a shot change candidate region based on a global color distribution;

detecting an abridged shot change candidate region based on the global color distribution;

decoding a plurality of frames in the shot change candidate region;

determining a distribution characteristic of an intra coded block and a reference pattern type of frames in the candidate region; and detecting a cut based on the distribution characteristic of the intra coded block and the reference pattern type, wherein detecting the abridged shot change candidate region comprises:

finding a difference of global color histograms among adjacent I/P, P/P, P/I frames by decoding I, P frames in the determined shot change candidate region;

selecting a candidate region based on the difference of the global color histograms being a maximum; and selecting a region as the abridged shot change candidate region when the difference of the color histograms in the selected candidate region is larger than a threshold or performing the shot change candidate detection for a next Group of Picture (GOP) region when the difference of the color histograms in the selected candidate region is not larger than the threshold.

15. The shot change detection method of claim 14, wherein the threshold is a substantially same value as a threshold for determining the shot change candidate region based on the difference of the global color histograms.

16. A shot change detection method for MPEG-compressed video comprising:

determining a shot change candidate region based on a global color distribution;

detecting an abridged shot change candidate region based on the global color distribution;

decoding a plurality of frames in the shot change candidate region;

determining a distribution characteristic of an intra coded block and a reference pattern type of frames in the candidate region; and detecting a cut based on the distribution characteristic of the intra coded block and the reference pattern type, wherein detecting the abridged shot change candidate region comprises:

determining a difference of global color histograms among adjacent I/P, P/P, P/I frames by decoding the P frames in the determined shot change candidate region;

detecting a peak based on a peak detection algorithm; and selecting a region as the abridged shot change candidate region when a gradient about the detected peak is larger than a threshold or performing the shot change candidate detection about a next Group of Picture (GOP) region when the gradient about the detected peak is not larger than the threshold.

17. The shot change detection method of claim 16, wherein the peak detection algorithm uses the gradient about the difference of the color histograms among the frames or calculates a peak ratio about an average of the difference of the color histograms among the frames.

18. A shot change detection method for MPEG-compressed video comprising:

determining a shot change candidate region based on a global color distribution;

decoding a plurality of frames in the shot change candidate region;

determining a distribution characteristic of an intra coded block and a reference pattern type of frames in the candidate region; and detecting a cut based on the distribution characteristic of the intra coded block and the reference pattern type, wherein determining the reference pattern type includes determining the reference type as a forward reference pattern when a forward prediction ratio based on two thresholds is larger than another threshold, determines the reference type as a none reference pattern when the forward prediction ratio is between the two thresholds and determines the reference pattern as a backward reference pattern when the forward prediction ratio based on two thresholds is smaller than another threshold.

* * * * *